United States Patent [19]

Goor et al.

[11] Patent Number: 5,100,169
[45] Date of Patent: Mar. 31, 1992

[54] INTEGRAL INFLATABLE OCCUPANT RESTRAINT SYSTEM

[75] Inventors: Dan Goor; E. Patricia Goor, both of Colorado Springs, Colo.

[73] Assignee: Goor Associates, Inc., Colorado Springs, Colo.

[21] Appl. No.: 618,397

[22] Filed: Nov. 27, 1990

[51] Int. Cl.$^5$ .............................................. B60R 21/18
[52] U.S. Cl. .................................. 280/733; 280/801; 280/808
[58] Field of Search ........................ 280/733, 801, 808

[56] References Cited

U.S. PATENT DOCUMENTS

| | | | |
|---|---|---|---|
| 3,430,979 | 3/1969 | Terry et al. | 280/733 |
| 3,510,150 | 5/1970 | Wilfert | 280/733 |
| 3,706,462 | 12/1972 | Lilly | 280/733 |
| 3,706,463 | 12/1972 | Lipkin | 280/733 |
| 3,844,581 | 10/1974 | Fox | 280/733 |
| 3,866,940 | 2/1975 | Lewis | 280/733 |
| 3,883,053 | 5/1975 | Pritchard et al. | 224/733 |
| 3,905,615 | 9/1975 | Schulman | 280/733 |
| 3,971,569 | 7/1976 | Abe et al. | 280/733 |
| 3,975,037 | 8/1976 | Hontschik et al. | 280/733 |
| 4,348,037 | 9/1982 | Law et al. | 280/733 |
| 4,834,420 | 5/1989 | Sankrithi et al. | 280/728 |
| 4,971,354 | 11/1990 | Kim | 280/733 |

FOREIGN PATENT DOCUMENTS

| | | | |
|---|---|---|---|
| 2046426 | 3/1972 | Fed. Rep. of Germany | 280/733 |
| 88/07947 | 10/1988 | PCT Int'l Appl. | 280/733 |

OTHER PUBLICATIONS

Instruction Manual entitled: "Restraint Systems" 8M-1 (No Date).

*Primary Examiner*—Kenneth R. Rice
*Attorney, Agent, or Firm*—Weingarten, Schurgin, Gagnebin & Hayes

[57] ABSTRACT

An inflatable restraint system for providing protection to an occupant in a moving vehicle including a module disposed adjacent to the chest area of the vehicle occupant, the module having an airbag and an explosive device for exerting a controlled force against the occupant in a direction opposite the direction of motion of the occupant caused by rapid deceleration of the vehicle while simultaneously inflating the airbag adjacent to the occupant. A second embodiment is also disclosed, including an ancillary module disposed adjacent to the rear base of the occupant's neck, providing an airbag for inflation behind the occupant's head while simultaneously exerting a force opposite the direction of motion of the occupant's head, as caused by the backlash forces acting against the occupant following initial impact of the occupant with a forward airbag.

17 Claims, 4 Drawing Sheets

INTEGRAL INFLATABLE OCCUPANT RESTRAINT SYSTEM

FIELD OF THE INVENTION

The present invention relates generally to passive vehicle restraint systems and, more specifically, to an integral inflatable occupant restraint system.

BACKGROUND OF THE INVENTION

Various vehicle safety devices and passenger restraint systems are known in the art for protecting the occupants of a vehicle in the event of an accident Most recently, automobile manufacturers have begun to provide one or more inflatable airbags in the passenger compartment of a vehicle for nearly instantaneous inflation upon rapid deceleration of the vehicle, as caused by a collision. Such airbags provide a cushioned barrier between the occupant and the fixed surroundings of the vehicle passenger compartment for absorbing the forces exerted on the occupant in a collision.

Typically, the airbags of such prior art systems are mounted in various fixed locations in the passenger compartment of the vehicle such as the steering wheel, dashboard or the back panel of a seat (for rear seat passengers). In this configuration, it is necessary for the occupant to be positioned directly in alignment with the position where the airbag is mounted in order to provide effective protection to the occupant. This requirement presents a nuisance to the occupant and may actually create a safety risk in cases where the occupant is not positioned directly in front of the airbag when it is inflated.

Other inflatable safety systems have been designed for being disposed adjacent to the vehicle occupant, on a restraining belt, as shown in U.S. Pat. Nos. 3,430,979 and 3,706,462. These systems are designed to provide increased mobility for the occupant while maintaining effective protection thereof by deploying an inflatable cushion adjacent to the occupant in the event of an accident.

Inflatable restraint devices known in the art provide a cushion for absorbing the forces imparted to the occupant in the event of an accident, but do not provide any means for opposing the forces imparted to the occupant at the instant of rapid deceleration of the vehicle. By providing a system for opposing the forces imparted to the occupant, the destructive forces of a collision can be distributed over time and the forces absorbed by the occupant at the point of impact with the airbag can be reduced. Thus, it would be advantageous to provide an occupant restraint system that actually provides a controlled force against the occupant to oppose the motion of the occupant caused by the rapid deceleration of the vehicle while deploying an airbag, thereby reducing the magnitude of the force absorbed by the occupant at the point of impact with the airbag.

SUMMARY OF THE INVENTION

The present invention discloses an inflatable restraint system including a restraint module for being disposed adjacent to the chest area of a vehicle occupant to provide an inflatable shock absorbing cushion adjacent to the occupant while simultaneously exerting a controlled force against the occupant in a direction opposite the direction of motion of the occupant Accordingly, the restraint system of the present invention includes a module housing an inflatable bag and a controlled explosive device providing an explosive force upon rapid deceleration of the vehicle to deploy the inflatable bag adjacent to the vehicle occupant and to simultaneously generate a reactionary force against the occupant. The reactionary force created by the explosive device of the invention generates a controlled force against the occupant in a direction opposite the direction of motion of the occupant, thereby increasing the amount of time before the occupant impacts with the inflatable bag and decreasing the magnitude of the force absorbed by the occupant at the moment of impact with the airbag.

DESCRIPTION OF THE DRAWINGS

Other features and advantages of the invention will be apparent from the following detailed description of the invention in conjunction with the accompanying drawings, in which.

DETAILED DESCRIPTION OF THE INVENTION

Figure 1:
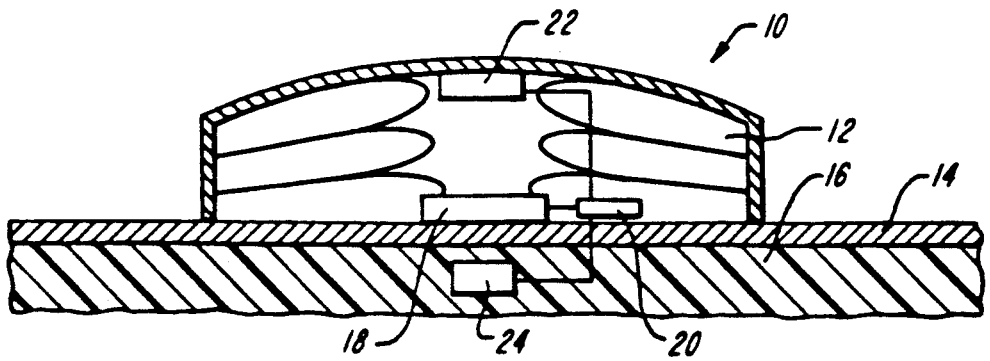
FIG. 1 is a cross-sectional view of the restraint module of the present invention.

Referring now to FIG. 1, the airbag restraint system of the present invention is embodied in a restraint module 10 including an airbag 12, shown in its collapsed state, mounted on a rigid membrane 14 adjacent to a protective cushion 16. An explosive device 18 is mounted within the module 10, adjacent to the rigid membrane 14 and coupled to an energy source 20 via a motion sensor 22. In addition, or alternatively, the explosive device 18 is also coupled to a pressure sensor 24 embedded in the protective cushion 16 and/or an impact sensor 26 (shown in FIG. 2) located on the vehicle in which the occupant is seated.

Figure 2:
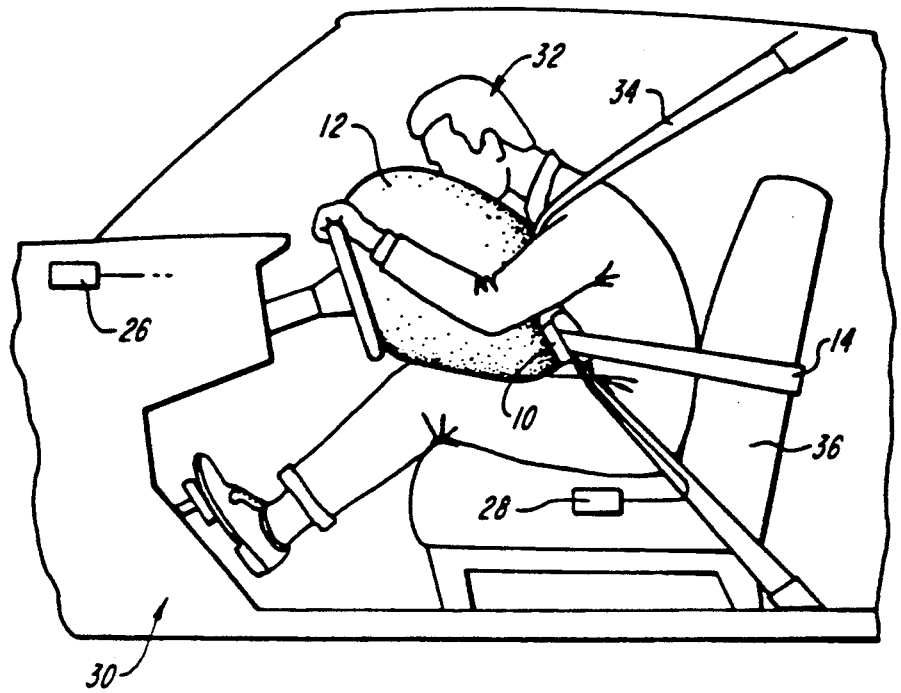
FIG. 2 is a side view showing the occupant restraint system of the present invention in its deployed state.

The module 10 is preferably a stand-alone module which can be mounted on a restraining harness in a vehicle, as shown in FIG. 2, or can be disposed on a vest worn by a vehicle occupant. This stand-alone feature allows the flexibility to manufacture and distribute customized airbag restraint systems in accordance with the invention, providing maximum individual comfort and protection for each individual depending on the size and weight of the individual.

Referring now to FIG. 2, there is shown a vehicle 30 with an occupant 32 seated within a shoulder harness 34 in a seat 36. The airbag restraint system of the present invention is shown in its deployed state with airbag 12 inflated to provide an impact absorbing cushion between the occupant 32 and the interior of the vehicle 30. Although the airbag restraint system is shown in conjunction with an automobile, it is contemplated that the present invention can be adapted for use in various passenger vehicles including trains and airplanes. It is further contemplated that the present airbag restraint system can be adapted for use with a child seat for providing protection to a child occupant.

In operation, the explosive device 18 is triggered upon rapid deceleration of the vehicle 30 to generate a transient explosive force. The transient force generated thereby is transmitted throughout the restraint module 10 to create a controlled force against the rigid membrane 14 in a direction opposite the forward motion of the vehicle occupant 32 caused by the rapid deceleration of the vehicle, while simultaneously deploying the airbag 12 from the restraint module 10 into the area immediately adjacent to the occupant 32. The explosive device 18 may take the form of one of various known systems which may include a self-contained $CO_2$ cartridge or some known chemical discharge mechanism.

Explosive device 18 is triggered by an output signal generated by motion sensor 22, pressure sensor 24, or impact sensor 26, similar to those presently known and in use in the art. A redundant triggering system is contemplated wherein the motion sensor 22, detecting the occupant's rate of movement, the pressure sensor 24, detecting the pressure exerted by the occupant against the module 10, and the vehicle impact sensor 26, detecting vehicle integrity, are each coupled to the explosive device 18 for providing an output signal thereto.

Figure 3:
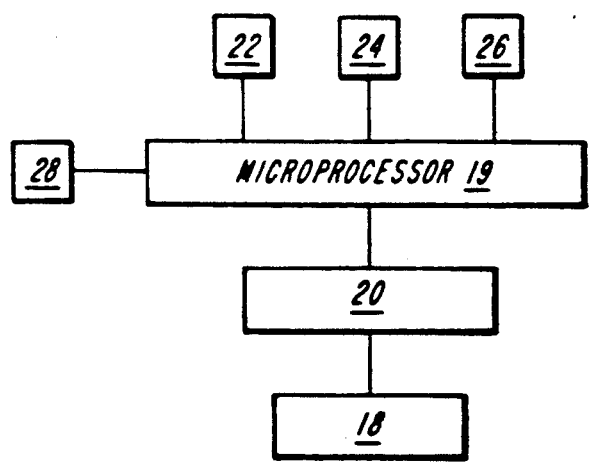
FIG. 3 is a block diagram of an interdependent sensing and arming system for triggering the present invention.

In the interest of providing a dependable deployment of the airbag 12 while preventing accidental deployment thereof, the sensors 22, 24, 26 can be configured to operate interdependently. For example, sensors 22, 24, 26 can be connected in series or can be coupled to the explosive device 18 via a microprocessor 19, in a configuration as shown in FIG. 3, wherein the microprocessor can be programmed so that the explosive device 18 will be triggered only if all three sensors 22, 24, 26 generate an output signal or if a combination of at least any two sensors detects a triggerable condition to generate an output signal. Of course, the restraint system can also be configured to be deployed in response to an output signal from a single sensor 22, 24, or 26.

An interlock arming system including a weight sensor 28 is also provided as a means for preventing accidental deployment of the airbag 12. The arming system is coupled to the explosive device 18 for detecting a predetermined weight, representing the presence of an occupant in the vehicle seat 36. This weight must be detected in order to "arm" the explosive device 18 so that it can be triggered by the sensors 22, 24, and/or 26. The interlock arming system may also include a manual switch which may be incorporated into a typical seatbelt buckle. The interlock arming system can also be coupled to the microprocessor 19 triggering system, as shown in FIG. 3.

Figure 4:
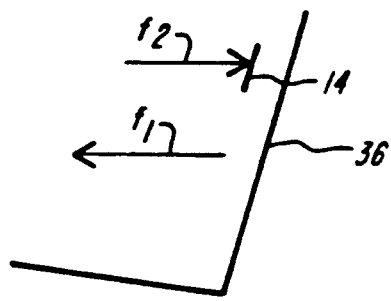
FIG. 4 is a schematic diagram showing the forces acting on the occupant at the moment that the present invention is deployed.

The advantages of the present invention can be best appreciated by representing the forces acting on the vehicle occupant 32 in schematic form as shown in FIG. 4. Force $f_2$ represents the reactionary force generated against the occupant 32 by the present restraint system. Force $f_2$ is directly opposite the force $f_1$ created by the rapid deceleration of the vehicle 10. The representative forces shown in FIG. 4 can be further reduced to basic physical equations to provide an explanation of the advantages provided by the present invention.

In the following description, it is assumed that the distance d that an occupant 32 travels within the vehicle compartment as the result of rapid deceleration of the vehicle will be constant for a given occupant of mass m. In reality, the present invention may actually reduce the distance that the occupant 32 will travel, resulting in a further reduction of the force $f_1$ acting on the occupant 32. The approach presented herein offers a conservative mathematical analysis for illustrative purposes only.

It is given through the laws of physics that velocity v is equal to distance d divided by time t and that force F is equal to velocity v times mass m as expressed in the following mathematical equations, respectively:

$$v = d/t; \quad d = vt \tag{1}$$

$$F = v \times m \tag{2}$$

Thus, the velocity and force generated by an occupant as it is accelerated in a rapidly decelerating vehicle is given by equations (1) and (2).

Applying a force $f_2$ in a direction opposing the acceleration of the occupant 32, as provided by the present invention, the time t that it takes for the occupant's body to travel the distance d from its position at rest to the point of impact with the airbag 16 is increased. Assuming the force exerted on the occupant 32 by the present invention increases the time to impact with the airbag by a factor of two, the velocity of the occupant's body utilizing the restraint system of the present invention becomes:

$$V_b = d/2t \tag{3}$$

Since the distance d that the occupant travels remains constant, equation (1) can be substituted into equation (3) to show that by using the restraint system of the present invention, the velocity $V_b$ of the occupant as it impacts the airbag is:

$$V_b = vt/2t = v/2 \tag{4}$$

Substituting the value for $V_b$ into the force equation:

$$F_b = V_b \times m = v/2 \times m = F/2. \tag{5}$$

Thus, it can be seen from this mathematical derivation that the force acting on an occupant 32 in a vehicle 10, during rapid deceleration thereof can be reduced in direct relationship to an increase in the amount of time to impact with the airbag 12. This increase in time is effected by the reactionary force generated by the restraint system of the present invention.

Figure 5:
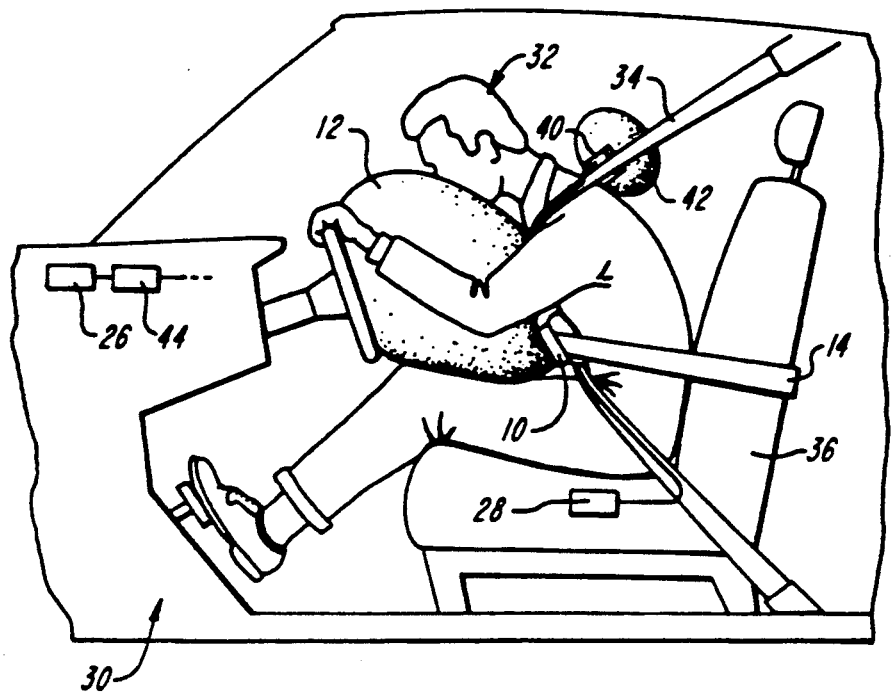
FIG. 5 is a side view showing an embodiment including a head protection restraint for use in conjunction with the forward airbag of the present invention.

A second embodiment of the present invention is illustrated in FIG. 5 wherein an ancillary restraint module 40 is positioned behind the base of the neck of the occupant 32. As in the embodiment described hereinabove, the ancillary restraint module 10 provides a reactionary force against the acceleration of the occupant's body while simultaneously deploying an airbag 42. In this embodiment, however, a delay mechanism 44 is coupled between the ancillary module 40 and the vehicle sensor 26 so that the ancillary module is triggered at a predetermined time after the triggering of the primary restraint module 10.

Figure 6:
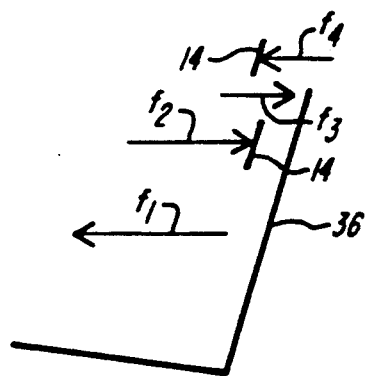
FIG. 6 is a schematic diagram showing the forces acting on the occupant in the embodiment of FIG. 5.

As shown in FIG. 6, this second embodiment generates a force $f_4$ to counteract the force $f_3$ acting on the occupant's head generated by the impact of the occupant 32 with the primary airbag 12. It follows, therefore, from the above mathematical derivation, that the reactionary force $f_4$ generated by the ancillary module 40 further reduces the forces exerted against the occupant's thereby and reducing whiplash effects on the occupant 32. The dual airbag system shown in FIG. 5 operates to dampen both the forward and rearward movement of the occupant in a severe accident, decreasing the impact forces acting on the occupant 32. The combination of reactionary forces $f_2$ and $f_4$ provided by this dual airbag system can be adapted to the mass and velocity of the occupant being protected so that the present invention provides an adaptive restraining system which conforms to the severity of the forces acting on the occupant.

Figure 7:
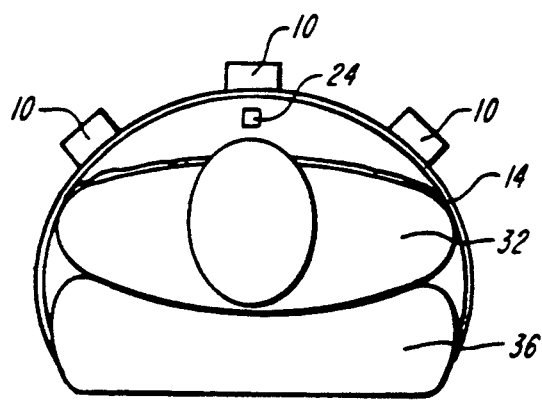
FIG. 7 is a to top view showing an embodiment of the present invention utilizing a plurality of restraint modules.

As shown in FIG. 7, the restraint system of the present invention can also be implemented via a plurality of restraint modules 10 disposed across the body of an occupant 32 along a rigid membrane 14, providing multiple independent airbags adjacent to the occupant. This configuration of multiple restraint modules 10 provides additional side protection to the occupant 32 as well as a distribution of the reactionary forces acting against the occupant 32.

The presently described integral inflatable restraint system is illustrative of a novel apparatus for providing dynamic protection for the occupants of a moving vehicle. It will be appreciated that other modifications, embodiments and departures from the present disclosure, such as the implementation of this device in conjunction with a child seat for providing additional protection to a child are possible without departing from the inventive concept contained herein. Consequently, the invention is to be viewed as embracing each and every novel feature as well as any novel combination of features present in, or possessed by, the inflatable restraint system disclosed herein and is to be limited solely by the scope and spirit of the appended claims.

What is claimed is:

1. A vehicle independent inflatable restraint system for protecting an occupant in a moving vehicle upon rapid deceleration thereof, comprising:
   at least one restraint module mounted on a rigid membrane for being adjustably disposed adjacent to the occupant, said module including:
      an inflatable bag for deployment from said restraint module in a direction away from the occupant;
      explosive means for generating a controlled explosion in said module, said explosion creating transient forces for inflating said inflatable bag and for exerting a reactionary force against the occupant in a direction opposite the direction of inflation of the inflatable bag;
      means, coupled to said explosive means, for providing combustion energy thereto; and
   at least one sensor means, coupled to said means for providing combustion energy to said explosive means, for providing an output signal to trigger said explosive means upon detection of a predetermined event.

2. The inflatable restraint system of claim 1, further including:
   a cushion being disposed between said module and the occupant for dispersing said reactionary force generated by said explosive means.

3. The inflatable restraint system of claim 1 wherein said at least one sensor means includes:
   at least one motion sensor coupled to said restraint module for detecting acceleration of the occupant to provide said output signal to said explosive means upon detection of a predetermined magnitude of acceleration.

4. The inflatable restraint system of claim 1 wherein said at least one sensor means includes:
   at least one impact sensor means coupled to the vehicle for detecting an impact force against the vehicle to provide said output signal to said explosive means upon detection of a predetermined magnitude of impact force.

5. The inflatable restraint system of claim 1 wherein said at least one sensor means includes:
   at least one pressure sensor coupled to said module for detecting pressure between said module and the occupant to provide said output signal to said explosive means upon detection of a predetermined magnitude of pressure.

6. The inflatable restraint system of claim 1, further including:
   microprocessor means coupled between said at least one sensor means and said means for providing combustion energy to said explosive means;
   said microprocessor means being programmable to provide a trigger signal to said means for providing combustion energy in response to said output signal from any one of said at least one sensing means.

7. The inflatable restraint system of claim 1, further including: p1 microprocessor means coupled between said at least one sensor means and said means for providing combustion energy to said explosive means;
   said microprocessor means being programmable to provide a trigger signal to said means for providing combustion energy in response to said output signal from a predetermined plurality of said at least one sensing means.

8. The inflatable restraint system of claim 1, further including:
   arming means for engaging and disengaging said at least one sensor means to prevent accidental activation thereof.

9. The inflatable restraint system of claim 8, further including:
   microprocessor means coupled between said at least one sensor means, said arming means and said means for providing combustion energy to said explosive means;
   said microprocessor means being programmable to provide a trigger signal to said means for providing combustion energy in response to an engagement signal from said arming means and said output signal from any one of said at least one sensing means.

10. The inflatable restraint system of claim 8, further including:
   microprocessor means coupled between said at least one sensor means, said arming means and said means for providing combustion energy to said explosive means;
   said microprocessor means being programmable to provide a trigger signal to said means for providing combustion energy in response to an engagement signal from said arming means and said output signal from a predetermined plurality of said at least one sensing means.

11. The inflatable restraint system of claim 8, wherein said arming means includes:
   manual switch means for operation by said occupant to engage and disengage said sensor means.

12. The inflatable restraint system of claim 8, wherein said arming means includes:
pressure switch means for detecting the presence of an occupant to engage said sensor means in response to the detection of an occupant.

13. The inflatable restraint system of claim 1, further including:
a shoulder harness for being disposed diagonally across the upper torso of the occupant, said restraint module being disposed thereon.

14. The inflatable restraint system of claim 1, further including:
a seat suitable for accommodating a child occupant.

15. A vehicle independent inflatable restraint system for protecting an occupant in a moving vehicle upon rapid deceleration thereof, comprising:
at least one first restraint module mounted on a rigid membrane for being adjustably disposed adjacent to the upper torso of the vehicle occupant;
at least one second restraint module mounted on a rigid membrane for being adjustably disposed adjacent to the rear base of the neck of the vehicle occupant;
said first and second restraint modules each including:
an inflatable bag for deployment from said restraint module in a direction away from the vehicle occupant;
explosive means for generating a controlled explosion in said restraint module, said controlled explosion creating transient forces for inflating said inflatable bag and for exerting a reactionary force against the occupant in a direction opposite the direction of inflation of the inflatable bag;
means, coupled to said explosive means, for providing a combustion energy thereto; and
at least one sensor means, coupled to each said means for providing combustion energy to said explosive means, for providing an output signal to trigger said explosive means upon detection of a predetermined event.

16. The inflatable restraint system of claim 15, further including:
delay means coupled to said second restraint module for delaying said output signal to said explosive means of said second restraint module for a predetermined period after triggering of said explosive means of said first restraint module.

17. A vehicle independent inflatable restraint system for providing protection to an occupant in a moving vehicle upon rapid deceleration thereof, comprising:
a plurality of restraint modules mounted on a rigid membrane for being adjustably disposed adjacent to the upper torso of the vehicle occupant, each said restraint module including:
an inflatable bag for deployment from said restraint module in a direction away from the vehicle occupant;
explosive means for generating a controlled explosion in said restraint module, said controlled explosion creating transient forces for inflating said inflatable bag and for exerting a reactionary force against the occupant in a direction opposite the direction of inflation of said inflatable bag;
means, coupled to said explosive means, for providing a combustion energy thereto; and
at least one sensor means, coupled to each said restraint module, each said at least one sensor means providing an output signal upon detection of a predetermined event for simultaneously triggering each said explosive means.

* * * * *